Patented Feb. 4, 1930

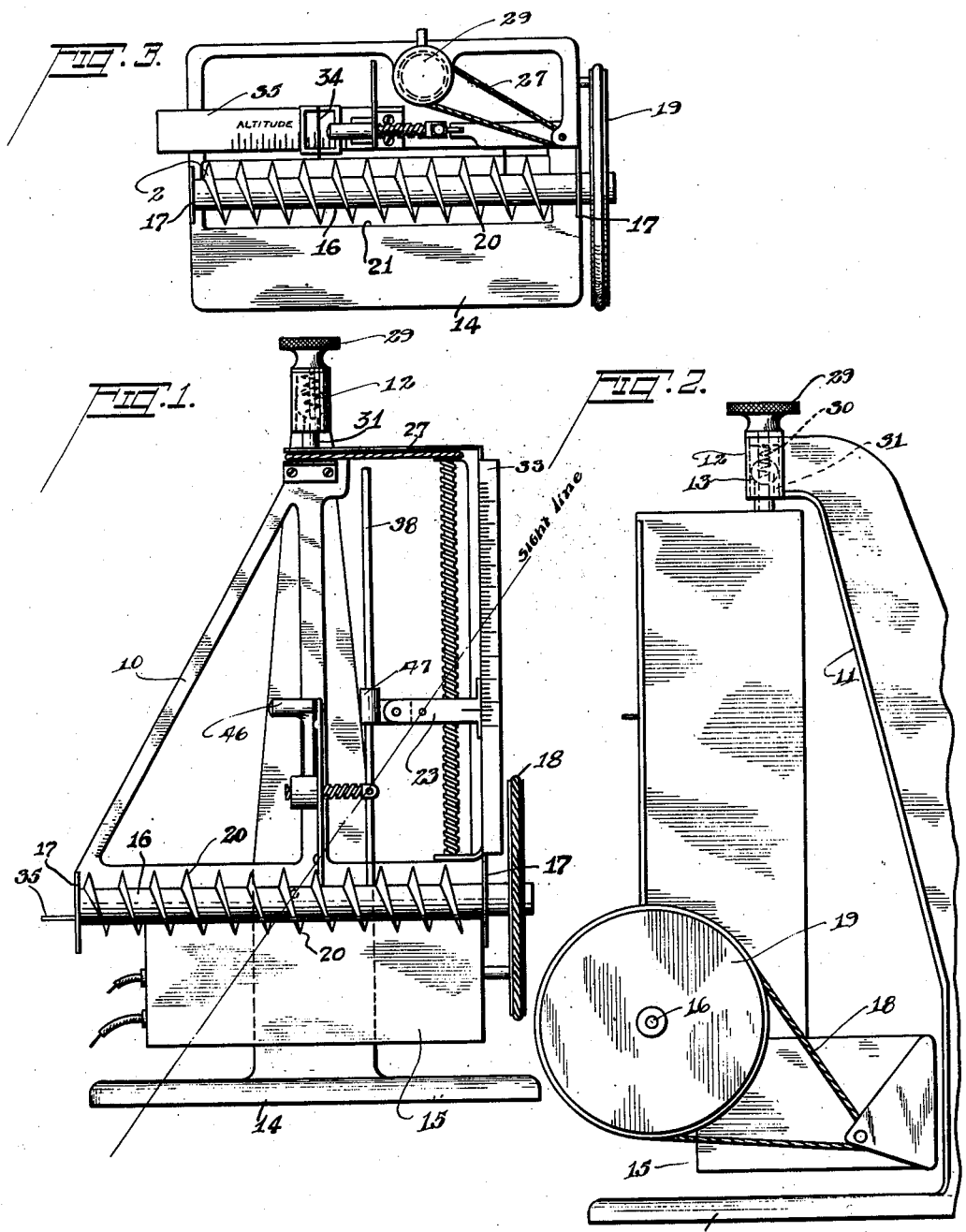

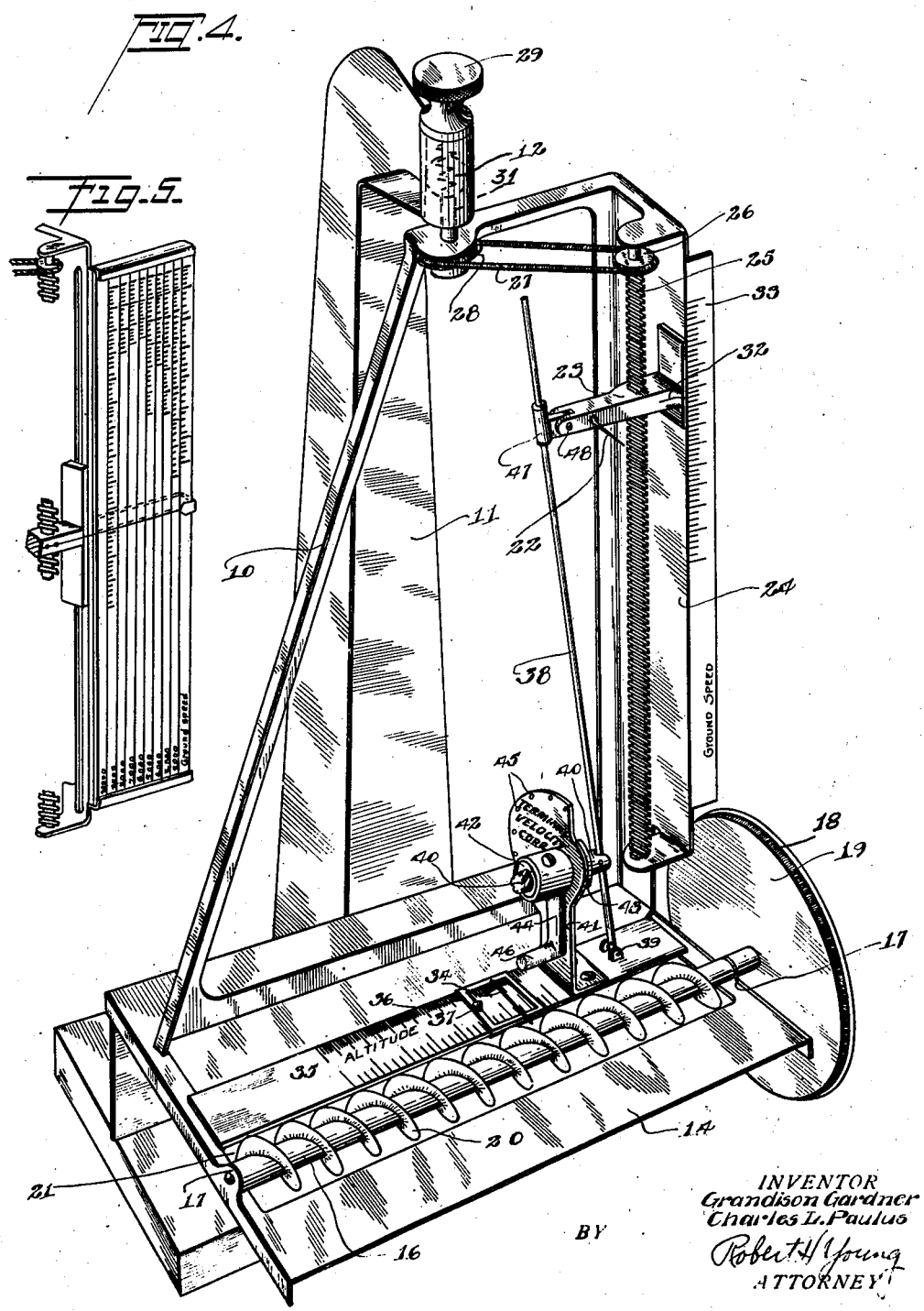

1,745,895

UNITED STATES PATENT OFFICE

GRANDISON GARDNER, OF HONOLULU, TERRITORY OF HAWAII, AND CHARLES L. PAULUS, OF DAYTON, OHIO

BOMB SIGHT

Application filed July 31, 1924. Serial No. 729,390.

This invention relates to bomb sights generally but more particularly to a bomb sight in which a sighting wire adjusted horizontally according to the altitude of flight is used, in connection with another sighting wire adjusted in relation therewith according to the ground speed.

The principal object of the invention is to provide a bomb sight in which is incorporated a means for determining the ground speed, the position of the sighting wire which indicates the ground speed being thereby determined in relation to a sighting wire set according to the altitude of flight. By means of this arrangement, the instrument may be used simply as a ground speed indicator when so desired.

Another object of the invention is to provide in connection with the sighting wire set according to the altitude of flight, a means for correcting the adjustment of this wire for the different bomb terminal velocities. A connection with the sighting wire set according to ground speed, as determined in the use of the instrument, is provided for the altitude sighting wire by which means proper corrections of the position of the altitude sighting wire are made automatically in the changing of the position of the ground speed sighting wire.

A still further object of the invention consists in the provision of a novel means for determining ground speed for use together with, or apart from a bomb sighting means.

Other objects and advantages are more fully set forth in the attached specification and claims, and in the drawings in connection with which the invention is described and in which:

Fig. 1 is a front elevation of a bomb sight constructed in accordance with the invention.

Fig. 2 is a side elevation.

Fig. 3 is a plan view, and

Fig. 4 is a perspective view of the instrument shown set to make a correction for a bomb terminal velocity.

Fig. 5 is a modification of the ground speed scale as shown in Fig. 4, for obtaining ground speeds at variable altitudes.

The instrument comprises a pendulum support 10 suspended from a bracket 11 mounted in any convenient place in the airplane cockpit. In the bearing 12 on the bracket 11 is incorporated a universal joint comprising a ball suspension member 13, to permit universal pivotal movement of the pendulum support 10, the purpose being to have the support occupy a substantially plumb position at the time an observation is being made. The support 10 comprises a horizontal base 14, on the under side of which is fastened a small constant speed electric motor 15 for driving a threaded shaft 16 journaled in bearings 17 on the base 14. The motor 15 drives the shaft 16 at a constant speed by a belt 18 passing over a small pulley on the motor armature shaft and over a large pulley 19 fixed on the shaft 16. A continuous thread 20 is provided on shaft 16 and is visible through a sight opening 21 in the base 14. In making an observation, an object on the ground is used as a point of reference and is observed through the sight opening 21. A sighting wire 22, to be hereinafter referred to as the ground speed sighting wire, is adjusted vertically by manual means to be later described, until it reaches the proper point for the altitude. At this position of the wire 22, with the eye, an object on the ground, and the sighting wire 22 all in alignment, the thread 20 will follow the object on the ground from one end of the opening 21 to the other in the continuous turning of the shaft 16. The wire 22 projects from a block 23 slidable up and down relative to a guide 24 provided on the support 10. A worm 25 threads through the block 23 and has a pulley 26 driven by a belt 27 from the pulley 28, which in turn is rotated manually by the knob 29 on top of the bracket 11. A suitable flexible connection, including a spring 30 inside the bearing 12, enables the adjustment of the worm 25 in various positions of angularity of the pendulum support 10 with respect to the knob 29 on the bracket 11. The pulley 28 is fixed on a short stem 31 rigidly connected with the spring 30 and rotatable within the ball suspension member 13. In the adjustment of the block 23 with the wire 22, an index 32 is moved relative to a scale 33 on the guide 24 calibrated in units relative to ground speed. The calibrations of the scale 33 are of course in proper relation to the speed at which the threaded shaft 16 is driven and the altitude at which the aircraft is flying, a different scale being used for each different altitude. Referring to Fig. 5, the ground speed scale is shown in a modified form, whereby correct ground speeds are directly readable by comparison with the proper ground speed scale, calibrated for the altitude at which the aircraft is flying. It will be seen that the portion of the instrument thus far described, apart from its use in connection with bomb sighting, serves as a ground speed indicator.

The wire 22, after its proper position has been determined, fixes one point on the line of sight to the target to be bombed; the other point in this line, set with the instrument, is determined by a wire 34 which is visible in the sight opening 21 alongside the thread 20. The wire 34 will hereinafter be referred to as the altitude sight wire. Theoretically, if bomb lag corrections are not considered, when the target to be bombed is sighted in line with wires 22 and 34, the bomb should be released and will travel to the target. The setting of the wire 34 is made relative to an altitude scale 35. A frame 36 carrying the wire 34 has a projecting finger piece 37 and is adjustable on the scale 35.

The settings of the wires 22 and 34 for ground speed and altitude are not sufficient to insure accurate bombing, and it is necessary to make a correction further for the trailing or lagging of the bomb in accordance with the terminal velocity thereof. In the present instrument, this correction is compounded on the ground speed and altitude adjustments. The altitude scale 35 is slidable on the base 14 alongside the sight opening 21. A rod 38 is pivoted at 39 on the scale 35 and extends upwardly alongside the worm 25 in the path of the block 23 with its wire 22. The rod 38 is arranged to be held in positions of different angularity relative to the scale 35 by means of a short worm 40 extending toward a bracket 41 projecting upwardly from and secured to the scale 35. A nut 42 threads on the worm 40 and extends through an opening in the bracket 41 with a flange 43 resting against one face of the bracket. A crank 44 is secured on the reduced portion of the nut 42 and serves in the rotating of the nut 42 to move the worm 40 toward and away from the bracket 41. Any one of a series of depressions 45 on a semi-circular sector on the bracket 41 is adapted to receive a spring-pressed plunger (not shown) working in the handle 46 of the crank 44, the particular depressions engaged depending upon the specific terminal velocity of the bomb to be dropped. Different bombs, having different terminal velocities, require greater or lesser corrections. The rod 38 has a sleeve 47 slidable thereon and pivotally connected at 48 to the block 23 so that, in the adjustment of the wire 22 up and down, movement is communicated to the scale 35 as the sleeve 47 slides along the rod 38 which is set in a certain position of angularity relative to the scale 35. It will be seen that the correction in the setting of the altitude sight wire 34 for a bomb terminal velocity consists in moving the wire more or less to the rear, that is, toward the observer sighting past the ground speed sight wire 22. This is assuming that the sight opening 21 has been disposed in the line of flight. Thus the bomb will be dropped later, in the case where a correction for terminal velocity is made, than where no correction is made, in order to allow for the bomb-lagging, and falling short of the theoretical line.

It is contemplated to locate the depressions 45 properly for the various degrees of trail angle ordinarily considered, and to provide different altitude scales for the different terminal velocities. In the drawing, it will be noted that there are separate scale readings provided on the scale 35 which will be used by the pilot or bomber in setting the sight for bombs of different terminal velocities. If desired, other scales may be provided to be interchanged for dropping different kinds of bombs, the proper scale being applied before leaving the ground. If proper settings are made with the proper scales, the travel of the target and the thread from the wire 34 to a position vertically beneath the rear sight wire 22, the interval after the bomb is dropped, requires exactly the same time that the bomb requires to fall to the target, even though the falling time varies with bombs of different terminal velocities. Where the ground speed of the airplane is great, a proportionately greater correction for terminal velocity must be made than where the ground speed is less. Where no correction is made for terminal velocity, the rod 38 occupies a vertical position at right angles with the scale 35 as shown in Fig. 1. In this position of the rod, it is obvious there will be no movement of the scale 35 upon adjustment of the ground speed sight wire 22.

In the use of the instrument, the pilot or observer sets the altitude sight wire according to the reading of his altimeter. He also sets the crank 44 at the proper depression 45 for the terminal velocity of the bomb to be dropped. Then, when the vicinity of the target to be bombed is reached, the adjustment of the ground speed sight wire 22 is made, sighting on any convenient object on the ground as a point of reference, it being preferable to select an object in the direct line of flight. Selecting a point on the thread 20, the observer adjusts the wire 22 by turning the knob 29 until the wire is in a position where the object on the ground remains in line with the wire 22 and the point on the thread as the thread moves length-wise of the sight opening 21. In his adjustment of the wire 22, the observer has automatically made the proper correction for terminal velocity, if he has previously set the crank 44 in the proper position for the bomb to be dropped. If not, this correction can as well be made after the adjustment of the ground speed sight wire 22 has been made. These adjustments require but a few moments and the pilot or observer is in readiness to drop the bomb when he approaches the target. The bomb is dropped after the target is picked up with the wire 22 and as it comes in a direct line passing through the wire 22 and the altitude sight wire 34.

We claim:—

1. In a ground speed indicating means, a support, a member thereon to be used as an operating reference in observing an object on the ground, means for moving said member to effect an apparent horizontal movement of the same at a constant speed, a vertical ground speed scale, and a sighting index on said support and adjacent said member adjustable along said scale.

2. In a ground speed indicating means, a support, a member thereon to be used as a moving reference in observing an object on the ground, a sight adjustable vertically transversely relative to said member until object on the ground is picked up with the reference in sighting as said reference is given an apparent horizontal movement at a uniform speed, and a scale on said support coacting with said sight for giving indications of ground speed for the various adjustments of said sight.

3. In a ground speed indicator, a support, a rotary threaded shaft thereon driven at a constant speed, there being an orifice in said support through which the apparent longitudinal movement of the threads of said shaft is visible in sighting on an object on the ground, a sighting index adjustable vertically transversely relative to said shaft in picking up an object on the ground in sighting, and a scale over which said index operates to indicate the ground speed from the position of said index.

4. In a ground speed indicator, a support suspended for universal pivotal movement, a rotary threaded shaft thereon, means for driving said shaft at a constant speed, there being an orifice in said support in the line of flight through which the apparent longitudinal movement of the threads of said shaft is visible in sighting on an object on the ground, a sighting index adjustable vertically transversely relative to said shaft in picking up an object on the ground in sighting, and a scale over which said index operates to indicate the ground speed from the position of said index.

5. In a ground speed indicator, a pendulous support, a universal joint mounting supporting the same to permit universal movement of said support, there being an elongated horizontal sight opening provided in said support in the line of flight through which an object on the ground may be observed, a rotatable threaded shaft having its threads visible in said sight opening, a sight adjustable vertically on said support, a worm to move the same, a flexible driving connection for said worm in said universal joint mounting, and a ground speed scale adjacent and over which said sight moves in its adjustment.

6. In a bomb sight for aircraft, a reference, means for moving said reference at all times at a constant rate, a sight member adjustable to a position relative to said reference to follow an object on the ground in sighting over said reference, and a second sight member according to the altitude of flight of the aircraft for cooperation with said first-named sight member.

7. In a bomb sight for aircraft, a reference, means for moving said reference at all times at a fixed constant rate, a sight member adjustable to a position relative to said reference to follow an object on the ground in sighting over said reference, a second sight member adjustable according to the altitude of flight of the aircraft for cooperation with said first-named sight member, and means connecting said members to correct the setting of one of said sights for the terminal velocity of the bomb to be dropped.

8. In a bomb sight for aircraft, a reference having an apparent movement at a constant rate, a sight member adjustable to a position to pick up an object on the ground in sighting together with said reference, a second sight member adjustable according to the altitude of flight of the aircraft, and means comprising a mechanical connection between said sights whereby in the adjustment of one of said sights, the other sight is adjusted to correct for the terminal velocity of the bomb to be dropped.

9. In a bomb sight, a sliding altitude scale, a sight to be set thereon according to the altitude of flight, a second sight adjustable relative to said first sight according to the ground speed, and a connection between said second sight and said sliding scale to move the latter to correct for the terminal velocity of the bomb to be dropped.

10. In a bomb sight, a sliding altitude scale, a sight to be set thereon according to the altitude of flight, a second sight adjustable vertically relative to said first sight according to the ground speed, and a connection between said second sight and said sliding scale to move the latter to correct for the terminal velocity of the bomb to be dropped, said connection comprising a rod pivoted on the sliding scale, means to hold the rod in different positions of angularity relative to said scale for different bomb terminal velocities, and a sleeve pivoted on said second sight slidable on said rod.

11. In a bomb sight, the combination with a support, of a sight thereon set according to altitude, a second sight on said support, said second sight being adjusted according to ground speed, means for determining the adjustment of said second sight comprising a threaded shaft on said support driven at a constant speed, said shaft having its threads visible in a sight opening in said support and means for adjusting said second sight until a moving line of sight over said second sight to an object on the ground coincides with the apparent longitudinal movement of the thread on said threaded shaft.

12. In a bomb sight, the combination with a support, of a sight thereon set according to altitude, a second sight on said support, said second sight being adjusted according to ground speed, means for determining the adjustment of said second sight comprising a threaded shaft on said support driven at a constant speed, said shaft having its threads visible in a sight opening in said support and means to change the position of one of said sights to correct for the terminal velocity of the bomb to be dropped.

13. In a bomb sight, the combination with a support, of a sight thereon set according to altitude, a second sight on said support, said second sight being adjusted according to ground speed, means for determining the adjustment of said second sight comprising a threaded shaft on said support driven at a constant speed, said shaft having its threads visible in a sight opening in said support and a mechanical connection between said adjusting means and said first sight to correct the position of the latter for the terminal velocity of the bomb to be dropped.

14. In a bomb sight, a support, a threaded shaft mounted thereon and driven at a constant speed, having its threads visible through a sight opening in said support, an altitude scale alongside said opening, a sight wire adjustable in said sight opening along said scale, and a second sight wire adjustable vertically until a moving line of sight over said second wire to an object on the ground coincides with the apparent longitudinal movement of the thread on said shaft.

15. In a bomb sight, a support, a threaded shaft mounted thereon and driven at a constant speed, having its threads visible through a sight opening in said support, an altitude scale adjustable back and forth alongside said opening, a sight wire adjustable on said scale and visible in said sight opening, a second sight wire adjustable vertically relative to said first sight wire for different ground speeds, means for adjusting said wire until a moving line of sight over said wire to an object on the ground corresponds with the apparent longitudinal movement of the thread on said threaded shaft and a connection between said adjusting means and said scale to move the same.

16. In a bomb sight, a support, a threaded shaft mounted thereon and driven at a constant speed, having its threads visible through a sight opening in said support, an altitude scale adjustable back and forth alongside said opening, a sight wire adjustable on said scale and visible in said sight opening, a second sight wire adjustable vertically relative to said first sight wire for different ground speeds, means for adjusting said wire until a moving line of sight over said wire to an object on the ground corresponds with the apparent longitudinal movement of the thread on said threaded shaft and a connection between the altitude scale and the ground speed scale comprising a rod mounted on said scale and having a connection with said adjusting means.

17. In a bomb sight, a support, a threaded shaft mounted thereon and driven at a constant speed, having its threads visible through a sight opening in said support, an altitude scale adjustable back and forth alongside said opening, a sight wire adjustable on said scale and visible in said sight opening, a second sight wire adjustable vertically relative to said first sight wire for different ground speeds, means for adjusting said wire until a moving line of sight over said wire to an object on the ground corresponds with the apparent longitudinal movement of the thread on said threaded shaft and a connection between said adjusting means and said scale comprising a rod pivotally mounted on said scale and having a sliding connection with said adjusting means and means for holding said rod in positions of different angularity relative to said scale.

In testimony whereof we affix our signatures.

GRANDISON GARDNER.
CHARLES L. PAULUS.